United States Patent [19]

Robertson

[11] Patent Number: 5,519,753
[45] Date of Patent: May 21, 1996

[54] X-RAY FILM CASSETTE HAVING EXTERNALLY LATCHED IDENTIFICATION WINDOW

[75] Inventor: Jeffrey C. Robertson, Rochester, N.Y.

[73] Assignee: Eastman Kodak Company, Rochester, N.Y.

[21] Appl. No.: 328,628

[22] Filed: Oct. 25, 1994

[51] Int. Cl.⁶ ................................................. G03B 17/26
[52] U.S. Cl. ........................... 378/182; 378/166; 378/165; 378/185
[58] Field of Search .................................... 378/185, 167, 378/169, 182, 187, 188, 165, 166

[56] References Cited

U.S. PATENT DOCUMENTS

| | | | |
|---|---|---|---|
| 2,140,515 | 12/1938 | Conklin | 378/182 |
| 4,289,586 | 3/1981 | Schmidt et al. | 378/187 |
| 4,313,538 | 2/1982 | Bauer et al. | 206/459 |
| 4,972,450 | 11/1990 | Carlile et al. | 378/166 |
| 5,388,140 | 2/1995 | Robertson | 378/182 |
| 5,448,615 | 9/1995 | Robertson | 378/182 |

*Primary Examiner*—David P. Porta
*Assistant Examiner*—Don Wong
*Attorney, Agent, or Firm*—Robert Luke Walker

[57] ABSTRACT

An x-ray cassette including a body having an interior configured to hold a sheet of x-ray film. The body has a window disposed for the transmission of light into the interior of the body. A shutter is mounted on the body. The shutter is free of apertures. The shutter is slideable relative to the window between a closed position, in which the shutter occludes the passage of light through the window, and an open position, in which the shutter is spaced apart from the window to allow the passage of light through the window. A mechanical latch is reversibly translatable between locked and released configurations. The latch in the locked configuration arrests the shutter in the closed position. The latch in the released configuration frees the shutter.

20 Claims, 9 Drawing Sheets

X-RAY FILM CASSETTE HAVING EXTERNALLY LATCHED IDENTIFICATION WINDOW

FIELD OF THE INVENTION

This invention relates to an x-ray film cassette, and more particularly relates to an x-ray film cassette having an externally latched identification window.

BACKGROUND

Most conventional x-rays are taken using a sheet of radiographic film retained within a cassette that includes an intensifying screen to convert the x-radiation to visible light. After exposure, the film is removed and processed and the cassette is reused. Where large numbers of x-rays are taken, it is desirable to label the film itself with patient information. For this purpose, many x-ray cassettes include a patient identification window. Typically, this feature consists of an opening covered by a light-tight movable shutter. In use, the cassette is placed in a specialized patient identification camera which establishes a light-tight seal against the cassette surrounding the window. The shutter is opened, patient identification information is transferred onto the x-ray film contained within the cassette using visible light, and the shutter is closed. When the shutter is position it is typically retained in place by a latching member or catch. Mechanical and magnetic latching members have been used.

U.S. Pat. Nos. 4,313,538 and 4,972,450 teach cassettes including patient identification windows. In both of these patents, the patient identification camera has a pin that moves through a hole in a hatch or slideable member to release a mechanical latching member or catch. The hatch or slideable member is slid open and closed using the same pin. The latching member or catch is resiliently biased and automatically re-engages when the pin is retracted after exposure of the film. A patient identification camera including such a pin mechanism is convenient; however, there is a shortcoming that the hatch or slideable member has an aperture extending through it and the latching mechanism must therefore also act as part of the light barrier. Parts of the light barrier require close tolerances and are subject to scuffing as the pin moves through the aperture and pivots the latching mechanism.

It would therefore be very desirable to be able to provide an x-ray cassette which has an aperture free shutter and a latching mechanism that is not part of the light barrier.

SUMMARY OF THE INVENTION

The invention provides an x-ray cassette including a body having an interior configured to hold a sheet of x-ray film. The body has a window disposed for the transmission of light into the interior of the body. A shutter is mounted on the body. The shutter is free of apertures. The shutter is slideable relative to the window between a closed position, in which the shutter occludes the passage of light through the window, and an open position, in which the shutter is spaced apart from the window to allow the passage of light through the window. A mechanical latch is reversibly translatable between locked and released configurations. The latch in the locked configuration arrests the shutter in the closed position. The latch in the released configuration frees the shutter.

It is an advantageous feature of at least one embodiment of the invention, that an x-ray cassette is provided which has an aperture free shutter and a latching mechanism that is not part of the light barrier.

BRIEF DESCRIPTION OF THE FIGURES

The above-mentioned and other features and objects of this invention and the manner of attaining them will become more apparent, and the invention itself will be better understood by reference to the following description of an embodiment of the invention taken in conjunction with the accompanying figures wherein.

DESCRIPTION OF PARTICULAR EMBODIMENTS

The drawings illustrate an embodiment of the x-ray cassette 20 of the invention. Referring initially to FIGS. 1–4C, the cassette 20 has a body 22 including a base 24 and a cover assembly 26 secured to base 24 by a hinge 27. A closure mechanism 28 holds cover assembly 26 against base 24 until released manually or by an appropriate film handling apparatus (not shown). The hinge 27 and closure 28 can each take a variety of forms, for example, the hinge 27 can be integrally formed of a single material, such as polypropylene, so as to provide what is commonly known as a living hinge.

Base 24 has a bottom panel 29, joined to a sidewall 30. A foam pad 31, made of a material such as an open cell polyurethane, is secured to the bottom panel 29. Cover assembly 26 includes a cover 32 and a pressure plate 34. The cover 32 has a top or cover panel 35 joined to an endwall 36. The pressure plate 34 is secured to the top panel 35. The pressure plate 34 includes on its lower surface a stimulable phosphor screen or layer (not separately illustrated). Suitable prompt emission or intensifying screens are well known to those skilled in the art.

The interior of the body 22, defined by the pressure plate 34 and base 24, forms an x-ray film chamber 38. This chamber 38 is configured to receive and tightly engage a sheet of x-ray film 40 with the phosphor screen in intimate contact with the film 40.

The pressure plate 34 and cover 32 each have a window 42,44, respectively. The windows 42,44 are in at least substantial alignment with each other and with a portion of chamber 38. It is preferred that windows 42,44 have substantially the same size and configuration. In the embodiment illustrated in the figures, both windows 42,44 have an elongated, rectangular outline.

Pressure plate window 42 defines a pair of opposed rails 43. The cassette 20 includes a shutter 46 that can be slid along the rails 43, between open and closed positions, by the pin 47 of a conventional patient identification camera (not shown). In the closed position, the shutter 46 occludes the pressure plate window 42, that is, entry of light through the pressure plate window 42 is completely blocked. (If desired, rails 43 can instead be defined by cover window 44. In that case, shutter 46 in closed position blocks the entry of light through window 42 and window 44.)

Figure 1:
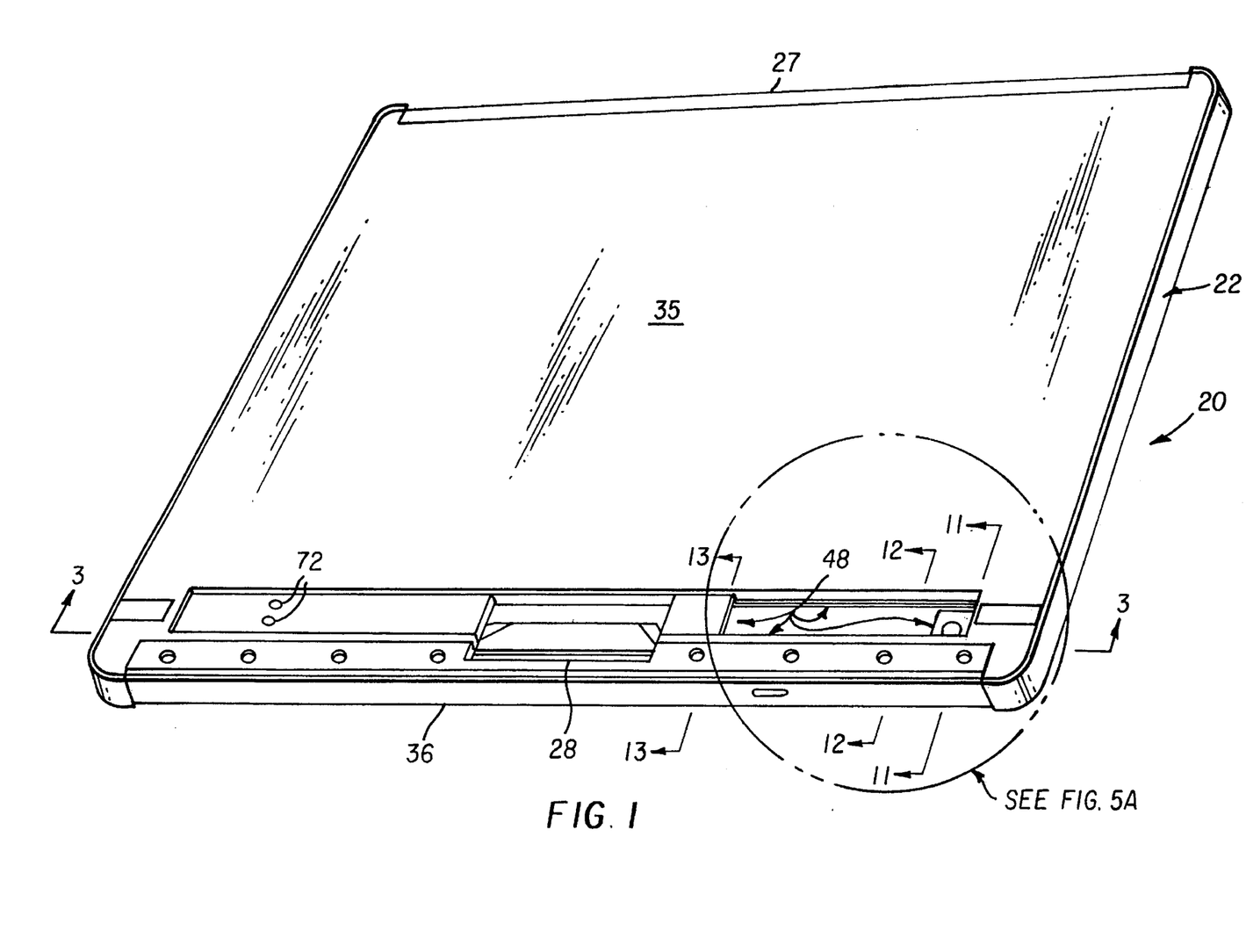
FIG. 1 is a perspective view of an embodiment of the x-ray cassette of the invention.
Figure 2:
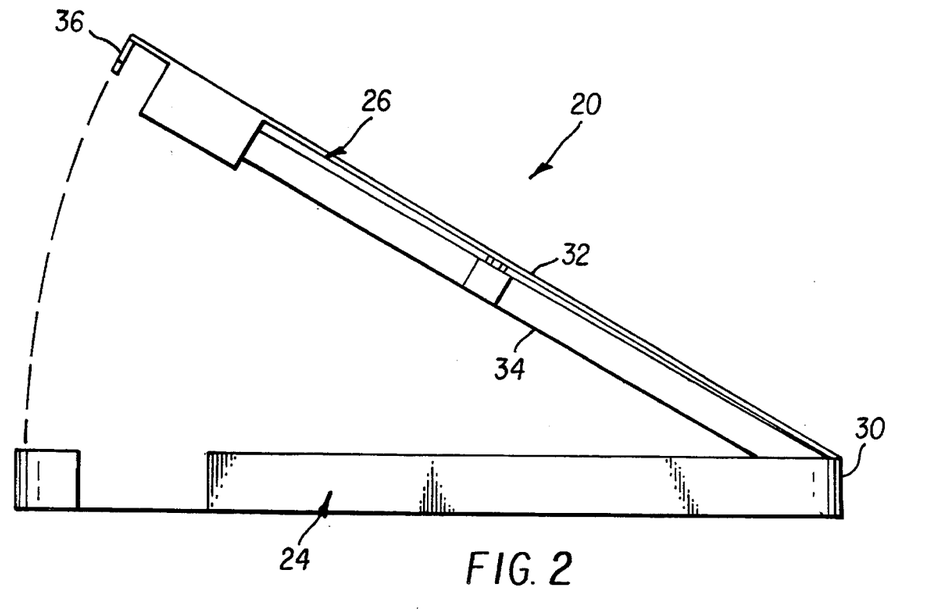
FIG. 2 is a side plan view of the x-ray cassette of FIG. 1 illustrating how the cassette opens.
Figure 3A:
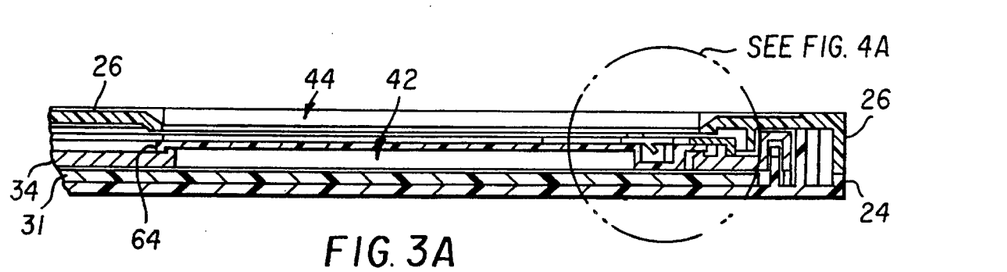
FIG. 3A is a cross-sectional view of the x-ray cassette of FIG. 1 taken substantially along section line 3—3 in FIG. 1 illustrating the shutter in a closed position and the latch in a locked configuration.
Figure 3B:
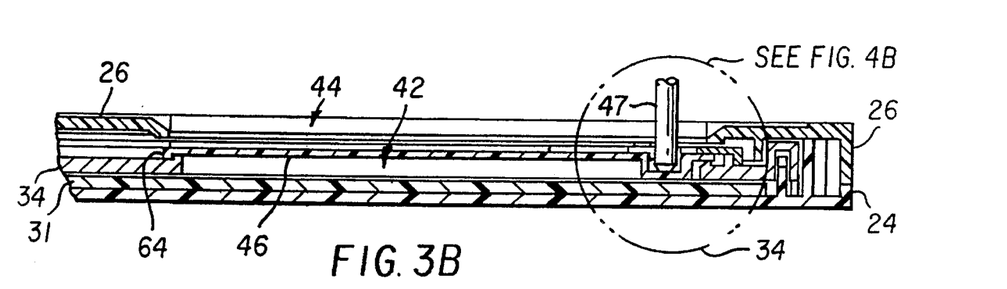
FIG. 3B is a cross-sectional view of the x-ray cassette of FIG. 1 taken substantially along section line 3—3 in FIG. 1. The pin of a patient identification camera is shown engaging the shutter and latch. The shutter is in a closed position and the latch is in a released configuration.
Figure 3C:
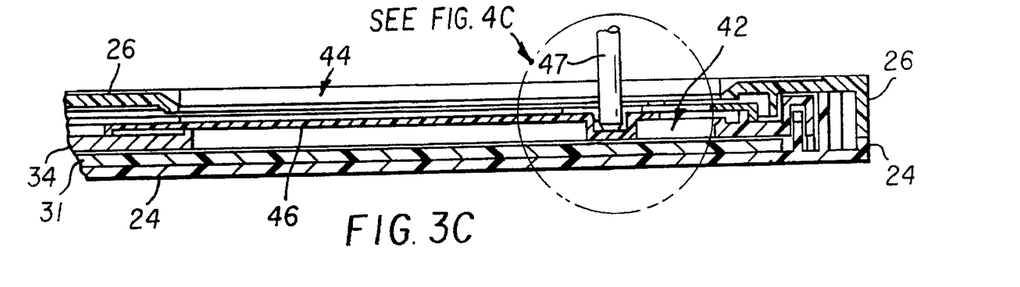
FIG. 3C is a cross-sectional view of the x-ray cassette of FIG. 1 taken substantially along section line 3—3 in FIG. 1. The pin of a patient identification camera is shown engaging the shutter and latch. The shutter is in an open position and the latch is in a released configuration.
Figure 4A:
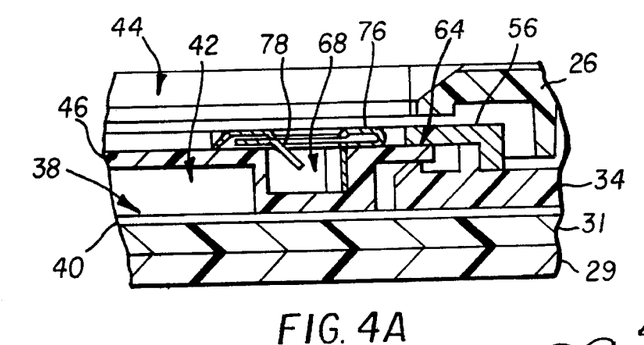
FIG. 4A is an enlargement of the same view as FIG. 3A illustrating substantially the area enclosed by circle 4A—4A in FIG. 3A.
Figure 4B:
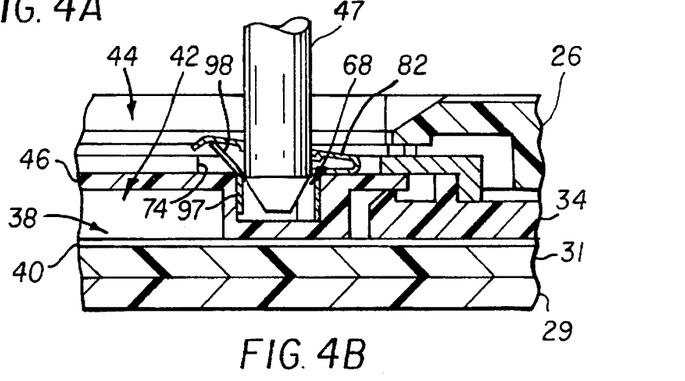
FIG. 4B is an enlargement of the same view as FIG. 3B illustrating substantially the area enclosed by circle 4B—4B in FIG. 3B.
Figure 4C:
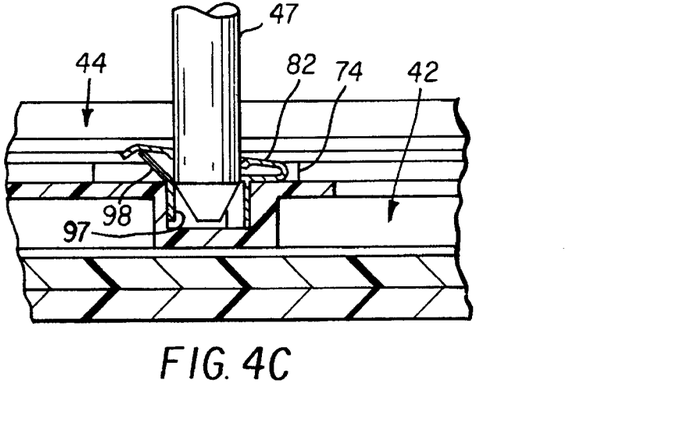
FIG. 4C is an enlargement of the same view as FIG. 3C illustrating substantially the area enclosed by circle 4C—4C in FOG. 3C
Figure 5A:
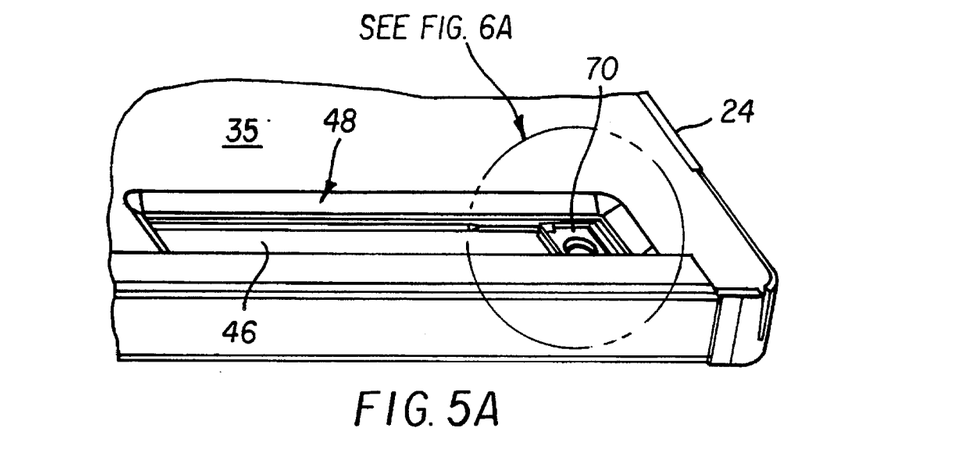
FIG. 5A is a partial, enlarged perspective view of the cassette of FIG. 1, taken substantially along circle 5—5 in FIG. 1, illustrating the shutter in same position and the latch in the same configuration as in FIG. 3A.
Figure 5B:
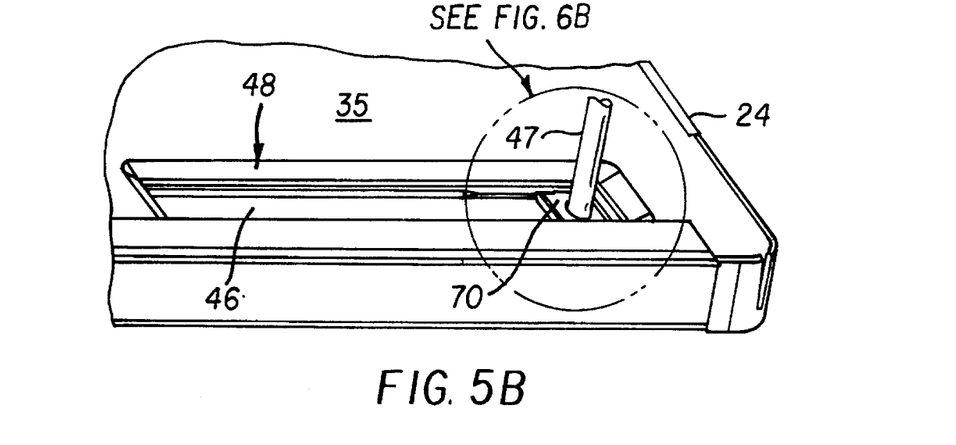
FIG. 5B is a partial, enlarged perspective view of the cassette of FIG. 1, taken substantially along circle 5—5 in FIG. 1, illustrating the pin of a patient identification camera engaging the shutter and latch. The shutter is in same position and the latch is in the same configuration as in FIG. 3B.
Figure 5C:
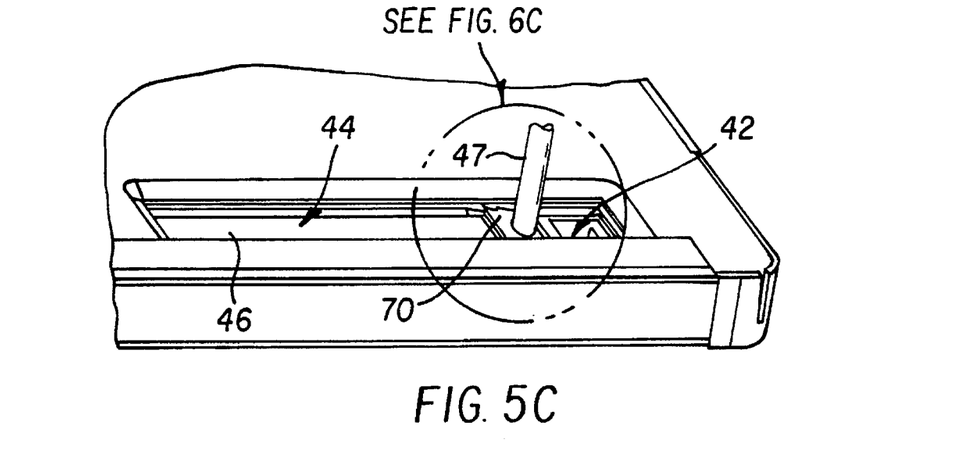
FIG. 5C is a partial, enlarged perspective view of the cassette of FIG. 1, taken substantially along circle 5—5 in FIG. 1, illustrating the pin of a patient identification camera engaging the shutter and latch. The shutter is in same position and the latch is in the same configuration as in FIG. 3C.
Figure 6A:
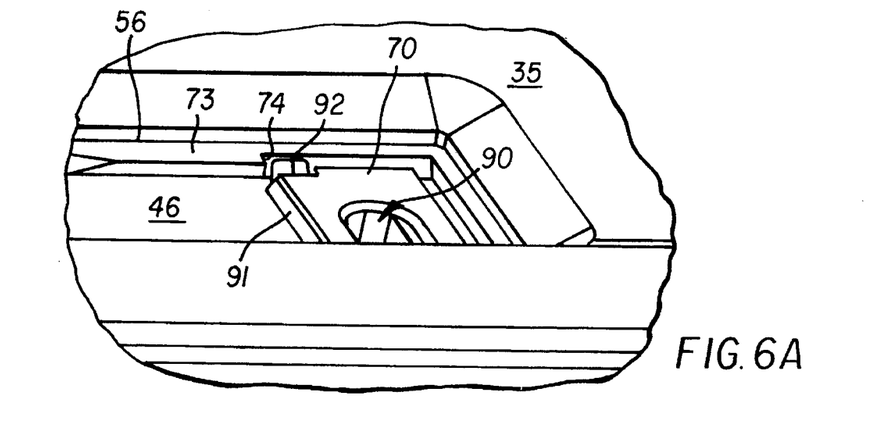
FIG. 6A is an enlargement of the same view as FIG. 5A illustrating substantially the area enclosed by circle 6A—6A in FIG. 5A.
Figure 6B:
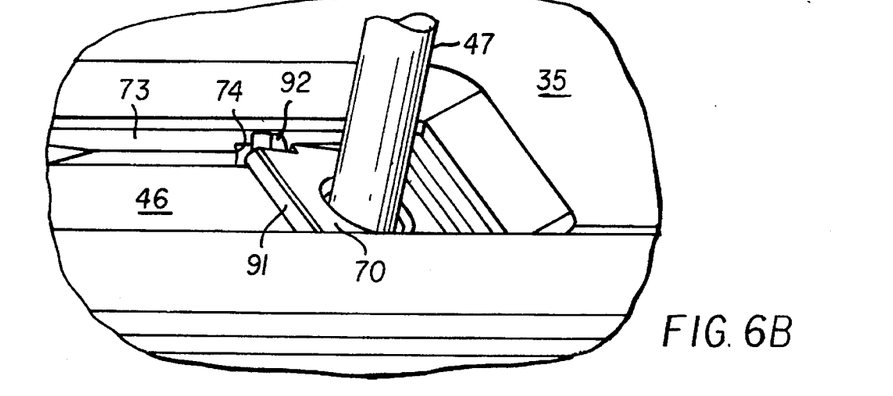
FIG. 6B is an enlargement of the same view as FIG. 5B illustrating substantially the area enclosed by circle 6B—6B in FIG. 5B.
Figure 6C:
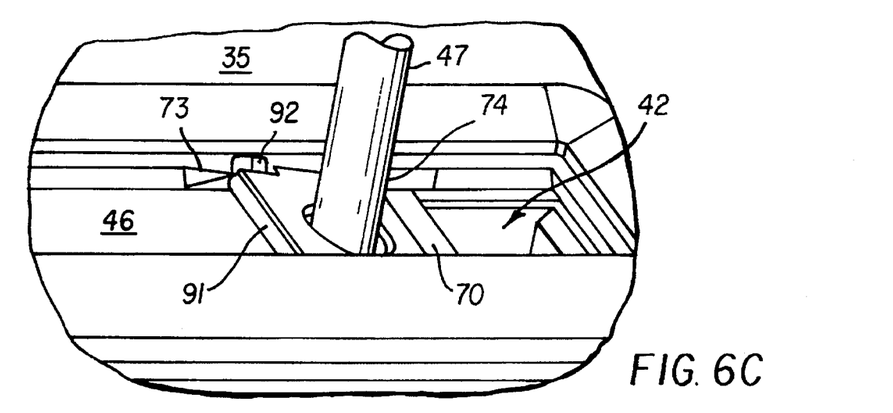
FIG. 6C is an enlargement of the same view as FIG. 5C illustrating substantially the area enclosed by circle 6C—6C in FIG. 5C.
Figure 7:
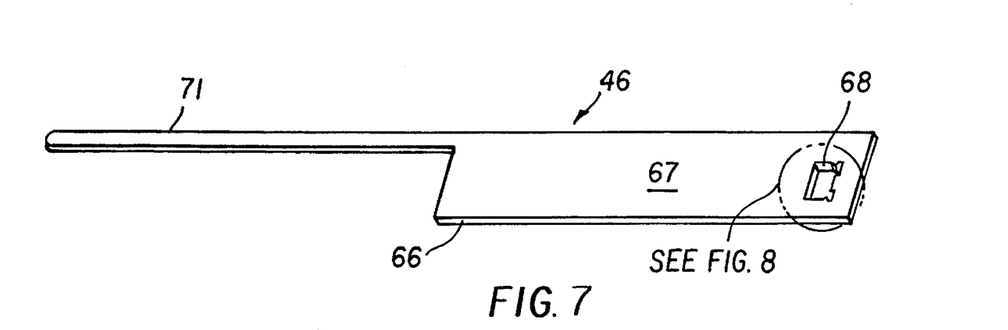
FIG. 7 is a perspective view of the shutter of the x-ray cassette of FIG. 1.
Figures 8, 10:
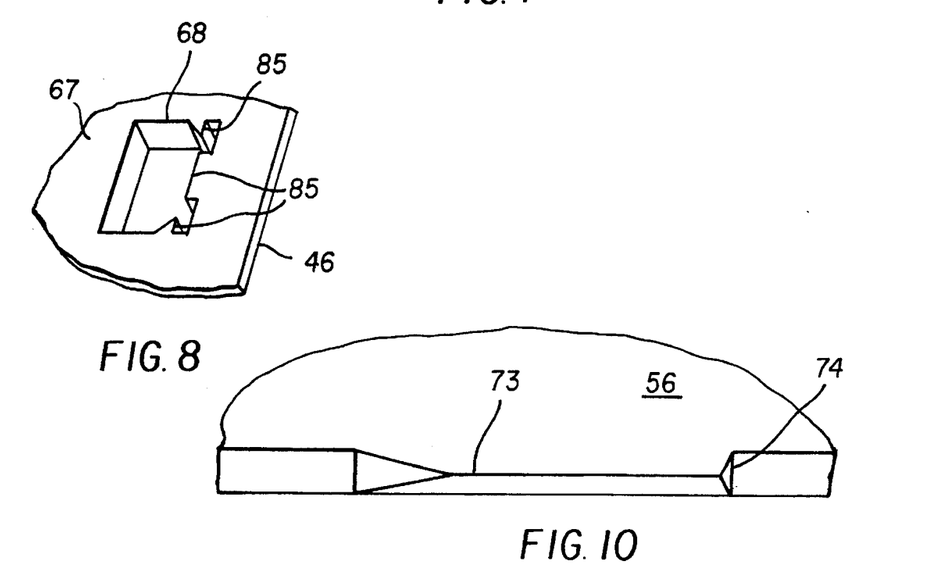
FIG. 8 is a partial enlargement of the view of FIG. 7 illustrating substantially the area enclosed by circle 8—8 in FIG. 7.
FIG. 10 is a partial enlargement of the view of FIG. 9 illustrating substantially the area enclosed by circle 10—10 in FIG. 9.
Figure 9:
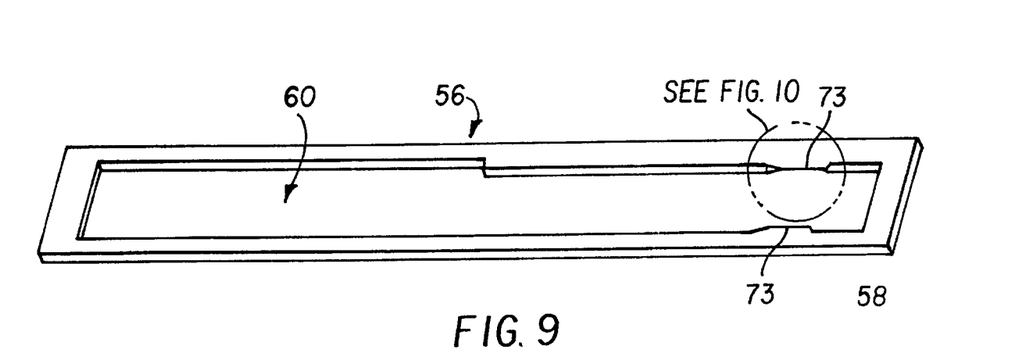
FIG. 9 is a perspective view of the shutter frame of the x-ray cassette of FIG. 1.

In the closed position, shutter 46 and body 22 define a shutter light seal or light lock (indicated by arrows 48 in FIG. 1). The shutter light seal 48 has a pair of rail portions or rail light seals 50 and a pair of end portions or end light seals 52, discussed below in detail. In the open position, the shutter 46 is displaced from the pressure plate window 42 and the cover window 44 so that patient information can be transmitted to the x-ray film sheet 40. Body 22 and windows 42,44 are configured such that except for light transmitted through windows 42,44, light is completely excluded from film 40. A light block is also provided against film 40 around window 42 so that light admitted through window 42 only exposes the portion of film 40 underlying window 42.

The rails 43 interlock with the shutter 46 to substantially prevent shutter 46 from moving toward or away from base 24 or transverse to rails 43. Similarly, the shutter 46 is rigid or substantially rigid to prevent deflection or other deformation. The shutter 46 and rails 43 define the rail light seals 50. Each rail light seal 50 is labyrinth, that is, the gap between the shutter 46 and each rail 43 is highly convoluted to block the entry of light. The convolutions necessary to interlock shutter 46 and rails 43 can be provided mostly by the shutter 46, or mostly by the rails 43, or by some combination of both. In the embodiment illustrated in the figures, the shutter 46 and rails 43 are related as tongue and groove, respectively. The groove or channel represents the space between the pressure plate 34 or other flat member and a shutter frame 56 having an L-shaped partial cross-section.

The shutter frame 56 can be attached to the pressure plate 34 or the top or bottom surface of cover panel 35. It is currently preferred that shutter frame 56 be attached to pressure plate 34 or the bottom of cover panel 35, since this permits shutter 46 to be recessed below the surface of cover 32 and reduces the exposure of shutter to accidental impacts. In the embodiment of the invention illustrated in the figures, the shutter frame 56 is secured to the pressure plate 34 and the shutter 46 is trapped between the shutter frame 56 and the pressure plate 34.

Shutter frame 56 has a face portion 58 that surrounds a frame opening 60. Shutter frame 56 is positioned so that frame opening 60 and pressure plate window 42 overlap. It is convenient if frame opening 60 is the same size and shape as pressure plate window 42. Frame opening 60 can, alternatively, be expanded, as shown in the figures, to extend over the portion of pressure plate 34 that shutter 46 overlies when in the open position. The latter alternative presents a savings in overall weight.

Figure 11:
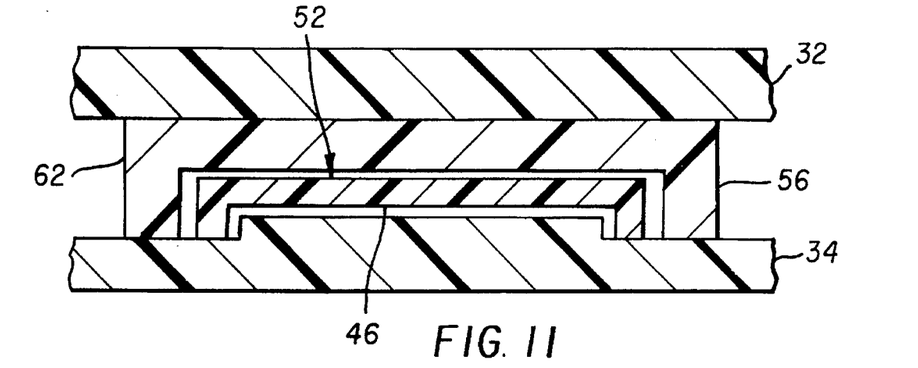
FIG. 11 is a partial cross-sectional view of the cassette of FIG. 1 taken substantially along line 11—11 in FIG. 1.
Figure 12:
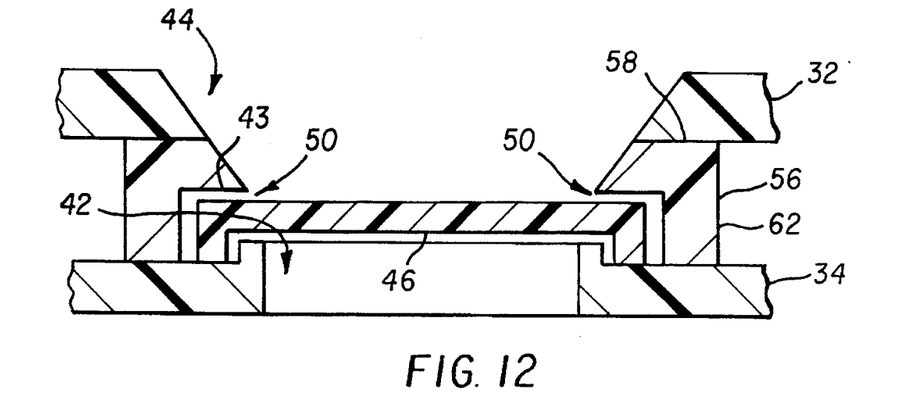
FIG. 12 is a partial cross-sectional view of the cassette of FIG. 1 taken substantially along line 12—12 in FIG. 1.
Figure 13:
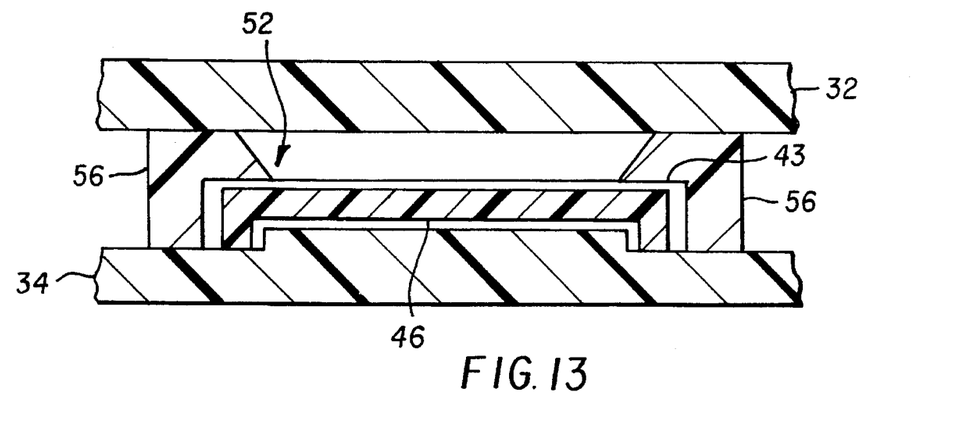
FIG. 13 is a partial cross-sectional view of the cassette of FIG. 1 taken substantially along line 13—13 in FIG. 1.
Figure 14A:
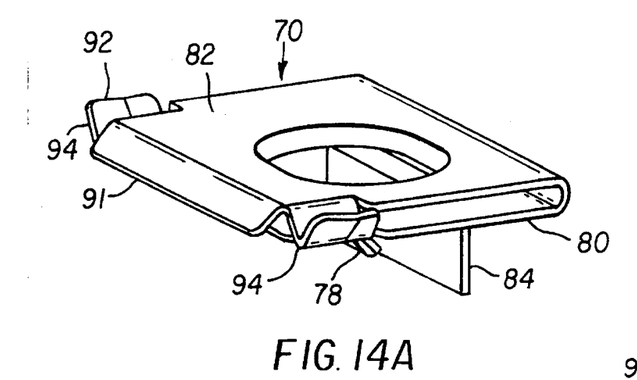
FIG. 14A is a front perspective view of the latch of the cassette of FIG. 1, illustrating the latch in the locked configuration also illustrated in FIG. 3A.
Figures 14B, 15A, 15B:
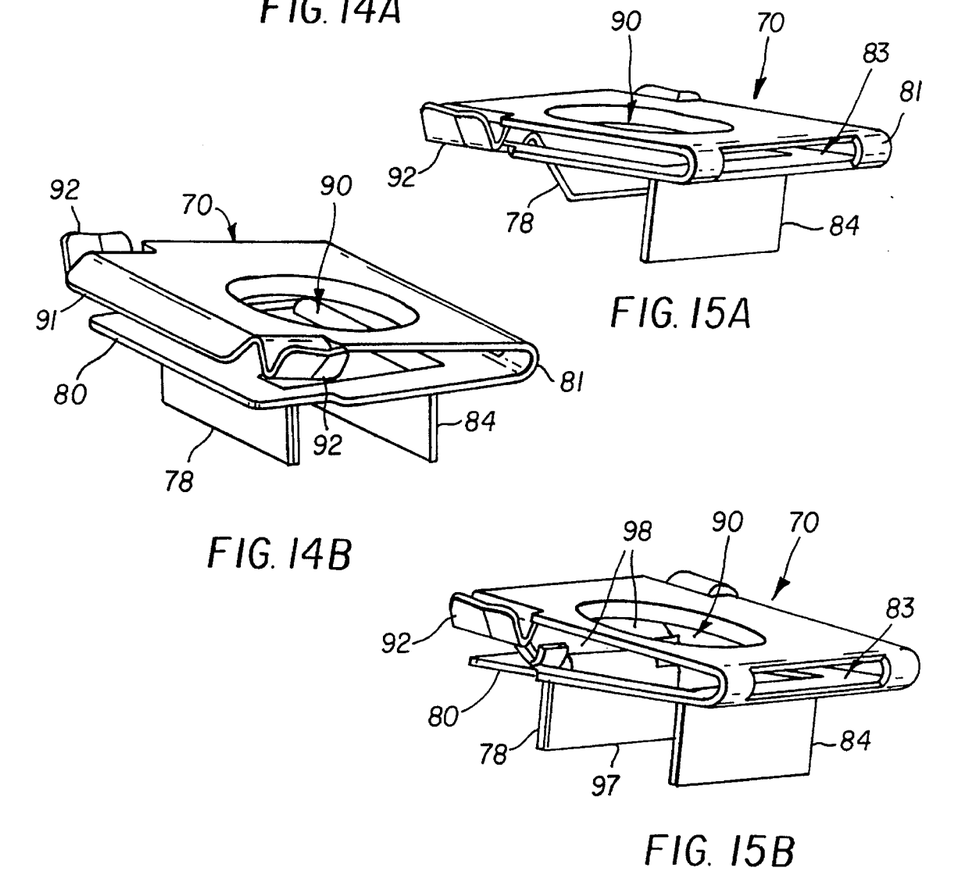
FIG. 14B is a front perspective view of the latch of the cassette of FIG. 1, illustrating the latch in the released configuration also illustrated in FIG. 3B.
FIG. 15A is a rear perspective view of the latch of the cassette of FIG. 1, illustrating the latch in the locked configuration also illustrated in FIG. 3A.
FIG. 15B is a rear perspective view of the latch of the cassette of FIG. 1, illustrating the latch in the released configuration also illustrated in FIG. 3B.
Figure 16:
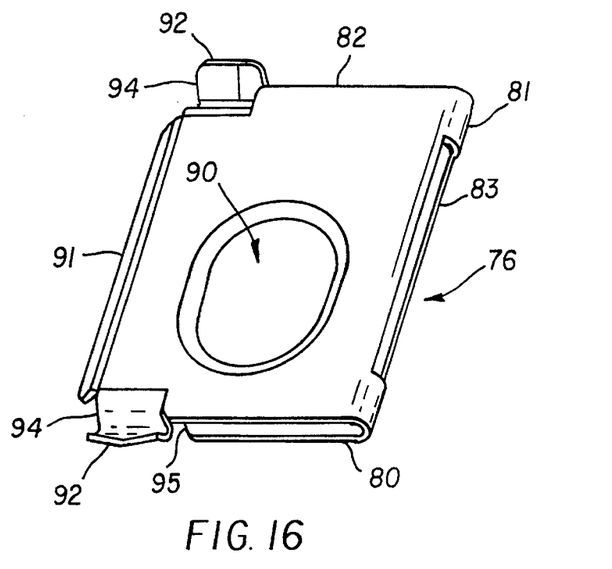
FIG. 16 is a top perspective view of the catch of the latch of FIGS. 14A—15C.
Figure 17:
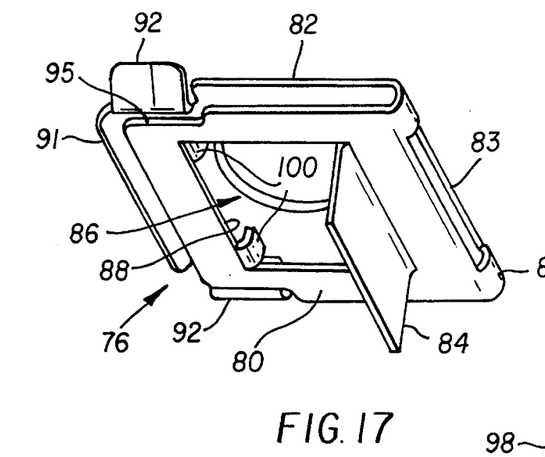
FIG. 17 is a bottom perspective view of the catch of the latch of FIGS. 14A—15C.
Figure 18:
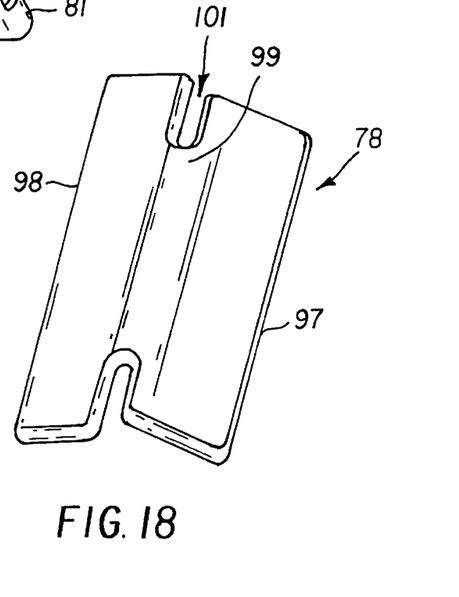
FIG. 18 is a top perspective view of the lever arm of the latch of FIGS. 14A—15C.

Extending downward from face portion 58 on all sides is a margin 62, which is secured to the pressure plate 34 by adhesive or the like, so as to provide a light-tight seal. Face portion 58, margin 62, and edges of pressure plate 34 surrounding pressure plate window 42 together define the continuous, planar channel, consisting of longitudinal rails 43 and transverse end portions 64. Rail portions of light seal 50 are labyrinthine and are defined by rails 43 and the adjoining edges of shutter 46 (FIG. 12). End light seals 52 are defined by channel end portions 64 and adjoining portions of shutter 46 (FIGS. 11 and 13). The rail and end light seals 50,52 do not require particularly close tolerances and have less wear problems than a light block dependent solely upon close contact between two surfaces. FIGS. 11–13 show large clearances between channel and shutter. These clearances are not considered optimal for the invention and are presented to improve the clarity of the drawings. Clearances can be minimized to further reduce the risk of inadvertent light entry.

Referring now particularly to FIGS. 5–8, the shutter 46 has a main portion 66 that is configured so as to be able to block the passage of light through the pressure plate window 42. In the embodiment shown in the figures the main portion 66 is rectangular in outline and slightly larger in both length and width than the pressure plate widow 42. The shutter 46 has a recessed socket 68 toward the rear of its upper surface. The socket 68 is blind. The shutter 46 has no apertures extending from upper surface 67 to shutter lower surface 69. Socket 68 is configured to receive and, optionally, retain a latch 70, which is discussed below in detail.

Shutter 46 can include an actuator 71 adapted to trip a visible indicator (shown as paired openings 72 in FIG. 1) to show that the shutter 46 was opened. Actuator 71 can be a simple bar or rod extending outward from main body 22 in the direction of travel of shutter 46. Indicators suitable for use with such actuators are disclosed in U.S. patent application Serial No. 08/086,019, filed Jun. 30, 1993, by Jeffrey C. Robertson and a Continuation-in-Part application Ser. No. 08/298,089, filed Aug. 30, 1994; both hereby incorporated herein by reference. These indicators also show whether film has been loaded into the cassette.

Toward one end of shutter frame 56 are a pair of frame flanges 73. Flanges 73 each extend inward toward shutter frame opening 60. The forward ends of flanges 73 each form an inwardly facing inclined ramp. At the rear of each flange 73 is a flattened surface. The surfaces together define a strike 74.

Referring now particularly to FIGS. 14A–18, latch 70 is located on the outer surface 67 of shutter external to shutter 46 and the light lock 48. Latch 70 has a main member 76 and a lever arm 78 and is translatable between locked and released configurations. Main member 76 has a shoe 80 and a catch 82. Shoe 80 is mounted to shutter 46. Catch 82 pivots relative to shoe 80 and shutter 46 and is resiliently biased toward shoe 80 and shutter 46. Catch 82 and shoe 80 are relatively rigid. Main member 76 can be conveniently made from appropriately cut and shaped spring steel sheet. A bent hinge section 81 connects catch 82 and shoe 80 and resiliently resists the pivoting of catch 82 in a direction outward from shoe 80. The area of hinge section 81 can be reduced by an excised cut-out 83, sized to moderate resiliency to a desired level by increasing the bending load per area.

Shoe 80 is secured in socket 68 of shutter 46. In a currently preferred embodiment of the invention, shoe 80 has a downwardly extending leg 84 that secures latch 70 in socket 68. Socket 68 can include bolsters 85 positioned to receive leg 84 in a bent configuration. The material of main member 76 can be selected to provide resilience. In that case, leg 84 will act as a spring and hold latch 70 within socket 68. Latch 70 could also be fastened or adhered to shutter 46.

Shoe 80 of latch 70 has a central opening 86. As a matter of convenience, central opening 86 can be square or rectangular and a flap of the material cut away to provide central opening 86 can be bent down to form leg 84. Opposite leg 84 is a pivot-edge 88.

Catch 82 has a central pin-opening 90 for the pin 47 of the patient identification camera. A close fit with pin 47 is unimportant, since pin and catch do not provide a light seal; thus pin-opening 90 can be enlarged relative to pin 47, to accommodate a degree of misalignment of cassette 20 and the patient identification camera. Pin-opening 90 can also have a recessed or countersunk margin to allow easier entry of pin 47. Opposite hinge section 81, catch 82 can have a downwardly deflected front edge 91 to reduce the possibility of catch 82 snagging on objects.

Catch 82 has a pair of laterally extending ears 92 slightly to the rear of front edge 91. Ears 92 have fronts, which together define an engagement surface 94 that bears against strike 74 when shutter 46 is in closed position and catch 82 is not pivoted. In the embodiment of the invention shown in the figures, ears 92 are V-shaped, with an upwardly directed trough that roughly parallels the direction of travel of shutter 46. This shape provides good strength and rigidity and minimizes weight. Ears 92 can be rounded to reduce snagging and creases can be added to increase rigidity. In this embodiment, flanges 73 of shutter frame 56 are sloped downward and inward complementary to the shape of the outer portion of ears 92 and shoe 80 has notches 95 into which ears 92 extend when catch 82 is not pivoted. These features reduce the range of deflection needed for catch 82 to function.

Interposed in latch 70 between catch 82 and shoe 80 is a lever-arm 78. Lever-arm 78 has first and second opposed arms 97,98 joined together along a pivot-center 99. Pivot-center 99 bears on pivot-edge 88 of shoe 80. In a preferred embodiment of the invention pivot-center 99 is loosely retained against pivot-edge 88. This can be conveniently provided by having tabs 100 adjoining pivot-edge 88 of shoe 80 extend upward through cut-outs 101 in pivot-center 99 of lever arm 78.

First arm 97 of lever-arm 78 is disposed directly beneath pin-opening 90 in socket 68 of shutter 46. Second arm 98 is disposed between shoe 80 and catch 82. When a downward force (in the direction of base 24) is applied to latch 70, first arm 97 pivots about pivot edge 88 in a direction outward from pin-opening 90 and second arm 98 pushes catch 82 away from shoe 80. When the downward force is released, catch 82 resiliently moves in the direction of shoe 80, pivoting first arm 97 of lever-arm 78 back toward pin-opening 90. In the embodiment shown in the figures, first and second arms 97,98 define a downwardly directed angle of less than 180 degrees. First arm 97 and second arm 98 are angled relative to each other as a fine adjustment on the range of deflection of catch 82. It is desirable that catch 82 deflect only so far as is necessary to accommodate shutter movement and manufacturing tolerances. Excessive deflection of catch 82 would increase the risk of accidental snagging on the operator's clothing or other foreign objects. Socket 68 is configured so as to not interfere with the movement of lever-arm 78.

In use, a sheet of film 40 is first loaded into cassette 20. Shutter 46 is initially in closed position and latch 70 is in locked configuration (FIGS. 3A, 4A, 5A, 6A, 14A, and 15A). Shutter 46 and body 22 define a light lock. Engagement surface 94 of catch 82 bears against strike 74 and arrests movement of shutter 46 out of closed position. (Shutter 46 can have slight free play within channel such that shutter 46 can be backed slightly away from strike 74, as long as light lock and pin access are not disrupted.)

Cassette 20 is then placed in a patient identification camera in registry with pin 47. The camera is actuated and pin 47 moves toward base 24 of cassette 20, first entering pin-opening 90 and then central opening 86 of shoe 80. Pin 47 enters socket 68 and engages first arm 97 of lever-arm 78 pivoting lever-arm 78 away from pin-opening 90 and against wall of socket 68. Second arm 98 of lever-arm 78 pushes against catch 82 pivoting catch 82 outward from shoe 80 about an axis extending through hinge section 81. The pivoting of catch 82 releases engagement surface 94 of catch 82 from strike 74 and raises ears 92 of catch 82 above the inner margin 62 of frame 56. Latch 70 is at this point in released configuration, but shutter 46 still remains in closed position and light lock is not disturbed (FIGS. 3B, 4B, 5B, 6B, 14B, and 15B).

Pin 47 is then moved longitudinally relative to shutter 46, while being retained in socket 68. As a result, shutter 46 is moved from closed position into an open position, while latch 70 remains in released configuration (FIGS. 3C, 4C, 5C, 6C, 14B, and 15B). This movement of shutter 46 is not encumbered by latch 70. When shutter 46 reaches an appropriate open position, the patient information is exposed on the film 40 through windows 42,44. In the embodiment of the invention shown in the figures, shutter 46 has a series of open positions, limited at one extreme by the maximum travel of shutter 46, and at the other extreme by the minimum area of film 40 necessary for the desired patient information. The open position actually used during cassette 20 operation is a function of the corresponding travel of the pin 47 of the patient identification camera. It is desirable that shutter 46 travel be adequate to prevent binding or other interference with the pin 47. Additional travel may be provided to accommodate another patient identification camera having additional pin travel or for ease in cleaning or the like.

After the patient identification information is exposed the process is reversed and the shutter 46 is returned to closed position, pin 47 is withdrawn, and latch 70 resiliently returns to locked configuration (FIGS. 3A, 4A, 5A, 6A, 14A, and 15A).

The invention has been described in detail with particular reference to certain preferred embodiments thereof, but it should be appreciated that variations and modifications can be effected within the spirit and scope of the invention.

What is claimed is:

1. An x-ray cassette comprising:

a body; a shutter; and a mechanical latch;

said body having a film chamber configured to hold a sheet of x-ray film, said body having a window disposed for the transmission of light into said film chamber;

said shutter being mounted on said body, said shutter being free of apertures extending through said shutter, said shutter being slideable relative to said window between a closed position wherein said shutter, independent of said latch, occludes the passage of light through said window and an open position wherein said shutter is spaced apart from said window to allow the passage of light through said window;

said latch being reversibly translatable, independent of said shutter, between locked and released configurations, said latch in said locked configuration arresting said shutter in said closed position, said latch in said released configuration freeing said shutter.

2. The x-ray cassette of claim 1 wherein said shutter is disposed between said latch and said film chamber of said body.

3. The x-ray cassette of claim 1 wherein said shutter and said body define a labyrinth light lock when said shutter is in said closed position, said latch being translatable between said locked and released configurations independent of said light lock.

4. The x-ray cassette of claim 1 wherein said latch has a shoe mounted to said shutter and a catch pivotable relative to said shutter, said catch pivoting in a direction outward from said shutter and said film chamber to translate said latch into said released configuration, said catch pivoting inward in a direction toward said shutter and said film chamber to translate said latch into said locked configuration.

5. The x-ray cassette of claim 4 wherein said catch is resiliently biased toward said shutter.

6. The x-ray cassette of claim 4 wherein said catch has a pin-opening and said latch includes a lever arm disposed beneath said pin-opening, said lever arm being disposed to pivot said catch, relative to said shutter, in response to a force directed through said pin-opening toward said shutter.

7. The x-ray cassette of claim 1 wherein said body further comprises a cover, a pressure plate disposed within said cover and a shutter frame mounted to said pressure plate, said cover and said pressure plate each having a window, said windows being at least substantially superimposed, said shutter frame having an opening interposed between said windows, said shutter being trapped between said shutter frame and said pressure plate.

8. The x-ray cassette of claim 7 wherein said latch has a shoe fixed to said shutter and a catch pivotable relative to said shutter, said shutter frame includes a strike, said catch is disposed to engage said strike when said latch is in said locked configuration, and said catch is pivoted out from said strike when said latch is in said released configuration.

9. The x-ray cassette of claim 8 wherein said latch and said shutter are recessed within said body.

10. The x-ray cassette of claim 1 wherein said shutter includes a socket and said latch has a lever arm and a main member, said main member having a shoe retained in said socket and a catch pivotable relative to said shoe, said catch pivoting outward from said shoe to translate said latch into said released configuration, said catch pivoting inward toward said shoe to translate said latch into said locked configuration, said catch having a pin-opening, said lever arm being disposed beneath said pin-opening, said lever arm being disposed to pivot said catch in response to a force directed through said pin-opening toward said shutter.

11. An x-ray cassette comprising:

a body enclosing an x-ray film chamber, said body having a window disposed for the transmission of light into said chamber, said body having a pair of opposed rails extending along and adjoining said window;

a shutter slideable along said rails between a closed position wherein said shutter and said body define a labyrinth light seal isolating said window from ambient light and an open position wherein said shutter is spaced apart from said window to allow the transmission of light through said window; and a catch mounted on said shutter exterior to said labyrinth light seal when said shutter is in said closed position, said catch being movable independent of said shutter between a locked configuration, wherein said catch retains said shutter in said closed position, and a released configuration, wherein movement of said shutter is substantially unencumbered by said catch.

12. The x-ray cassette of claim 11 wherein said shutter is at least substantially rigid and said rails substantially preclude movement of said shutter in directions toward said chamber, away from said chamber, and transverse to said rails.

13. The x-ray cassette of claim 11 wherein said shutter is free of apertures extending through said shutter.

14. The x-ray cassette of claim 13 wherein said catch is pivotable between said locked and released configurations and said catch is resiliently biased toward said shutter.

15. The x-ray cassette of claim 14 wherein said catch has a pin-opening and said cassette further comprises a lever arm disposed beneath said pin-opening, said lever arm pivoting said catch in response to a force directed through said pin-opening toward said shutter.

16. An x-ray cassette comprising:

a body enclosing an x-ray film chamber, said body having a window disposed for the transmission of light into said chamber, said body having a pair of opposed rails extending along and adjoining said window;

a shutter slideable along said rails between a closed position wherein said shutter and said body define a labyrinth light seal isolating said window from ambient light and an open position wherein said shutter is spaced apart from said window to allow the transmission of light through said window, said shutter having a socket;

a catch mounted on said shutter exterior to said window, said catch being movable independent of said shutter between a locked configuration, wherein said catch retains said shutter in said closed position, and a released configuration, wherein movement of said shutter is substantially unencumbered by said catch; and a shoe resiliently joined to said catch, said shoe being retained in said socket;

said catch being resiliently pivotable outward from said shoe, said catch having a pin-opening, said lever arm being disposed beneath said pin-opening, said lever arm being disposed to pivot said catch outward, relative to said shoe, from said locked position to said released position, in response to a force directed through said pin-opening toward said shutter.

17. An x-ray cassette comprising:

a base;

a cover adapted to close upon said base, said cover having a window;

a pressure plate disposed between said base and said cover, said pressure plate and said base forming a space for receiving a sheet of x-ray film, said pressure plate having a pressure plate window in substantial alignment with said cover window;

a shutter frame joined to said pressure plate, said shutter frame circumscribing said pressure plate window;

a shutter retained between said pressure plate and said shutter frame at a substantially fixed spatial separation from said base, said shutter being slideable between a closed position wherein said shutter occludes said pressure plate window and an open position wherein said shutter is spaced apart from said pressure plate window, said shutter having a socket; and a latch, having a shoe mounted in said socket and a catch translatable, relative to said shoe, between a locked configuration, wherein said latch retains said shutter in said closed position, and an unlocked configuration, wherein movement of said shutter is substantially unencumbered by said latch.

18. The x-ray cassette of claim 17 wherein said latch and said shutter frame are recessed relative to said cover.

19. The x-ray cassette of claim 17 wherein said shutter is free of apertures extending through said shutter and said shutter, said pressure plate, and said shutter frame together define a labyrinth light lock when said shutter is in said closed position, said latch being translatable between said locked and released configurations independent of said light lock.

20. The x-ray cassette of claim 19 wherein said latch has a shoe mounted to said shutter exterior to said pressure plate and a catch pivotable relative to said shutter, said catch pivoting outward from said shutter to place said latch in said released configuration, said catch pivoting inward toward said shutter to place said latch in said locked configuration, said catch being resiliently biased toward said shutter.

* * * * *